US005134189A

United States Patent [19]

Matsushita et al.

[11] Patent Number: 5,134,189

[45] Date of Patent: Jul. 28, 1992

[54] INK FOR HEAT-SENSITIVE RECORDING

[75] Inventors: Toshihiko Matsushita; Kiyoshi Shibuya, both of Tokyo; Sadao Morishita, Ushiku, all of Japan

[73] Assignee: Mitsubishi Paper Mills Limited, Japan

[21] Appl. No.: 433,910

[22] Filed: Nov. 9, 1989

[30] Foreign Application Priority Data

Nov. 10, 1988 [JP] Japan ............................... 63-285080

[51] Int. Cl.[5] ............................................ C08L 37/00

[52] U.S. Cl. .................................... 524/549; 524/556; 524/558; 524/560

[58] Field of Search ............... 524/549, 556, 558, 560; 503/214; 428/913, 914

[56] References Cited

U.S. PATENT DOCUMENTS

| | | | |
|---|---|---|---|
| 3,215,657 | 2/1965 | Beresniewicz | 524/549 |
| 4,521,793 | 6/1985 | Kabashima et al. | 427/261 |
| 4,797,385 | 1/1990 | Igarashi | 428/913 |
| 4,824,824 | 4/1989 | Matsushita | 503/217 |
| 4,880,767 | 11/1989 | Hiraishi et al. | 503/217 |

*Primary Examiner*—Joseph L. Schofer
*Assistant Examiner*—Jeffrey T. Smith
*Attorney, Agent, or Firm*—Cushman, Darby & Cushman

[57] ABSTRACT

An ink for heat-sensitive recording which comprises, as color developing components, an aromatic or heterocyclic isocyanate compound and an imino compound which are dispersed and/or dissolved in an organic solvent and, as a binder, (1) a copolymer of a mixture of component (a) which is an $\alpha,\beta$-ethylenically unsaturated carboxylic acid and component (b) which is at least one monomer selected from the group consisting of acrylic acid esters, methacrylic acid esters and aromatic vinyl compounds and/or (2) a three-component- or more component-copolymer, the fundamental skeleton of which is composed of isobutylene and maleic anhydride. The ink may additionally contain a heat-meltable substance and the like. The ink has a good wettability to a plastic substrate and can be dried rapidly in a printing machine.

19 Claims, No Drawings

INK FOR HEAT-SENSITIVE RECORDING

BACKGROUND OF THE INVENTION

This invention relates to an ink for heat-sensitive recording with which a substrate such as a plastic sheet can be partially printed and has strong adhesion to the substrate and forms a coat layer having high water-resistance.

Generally, heat-sensitive recording materials comprise a support having provided thereon a heat-sensitive recording layer comprising as essential components an electron donating, colorless dye precursor and an electron accepting color developer. Upon heating the heat-sensitive recording material by a thermal head, a thermal pen, a laser beam or the like, the dye precursor and the color developer instantly react with each other to give recorded images. Such heat-sensitive recording materials are disclosed in Japanese Patent Application Kokoku Nos. 43-4160, 45-14039 and the like.

If such heat-sensitive recording materials are used, records can be obtained by relatively simple apparatus, the maintenance of the apparatus is easy and no noise is made. Thus, the heat-sensitive recording materials are used in a wide variety of fields such as measuring recorders; facsimiles; printers; terminals of computers; automatic vending machines for labels, tickets and the like; etc.

Generally, these widely used heat-sensitive recording materials are obtained by coating the whole surface of paper used as a support with an aqueous coating composition for heat-sensitive recording. Recently, however, as another kind of heat-sensitive recording material, there are widely used prepaid cards such as shopping cards, highway cards and cards used in traffic facilities such as railroads, buses, taxies and the like. In manufacturing these cards, it is not necessary to coat the whole surface of the substrate with a coating composition for heat-sensitive recording, and in many cases, a partial printing is conducted in which only a given portion of the surface of the substrate is printed.

The heat-sensitive recording materials in which an electron donating, colorless dye precursor and an electron accepting color developer are used are advantageous in that they have good appearance and soft feel, the color density obtained is high and various hues can be obtained. However, these materials have poor record preservability for the following reasons: When the recorded area comes into contact with plastics such as polyvinylchloride or the like, the records disappear on account of a plasticizer, an additive or the like contained in the plastics. When the recorded area comes into contact with an agent contained in a food or a cosmetic, the records disappear. The records are extinguished by sunlight exposure in a short time. At present, therefore, the use of the above heat-sensitive recording materials is limited to some fields. Thus, there has been strongly desired development of a heat-sensitive recording material free from these disadvantages.

As heat-sensitive recording materials which give recorded images having high preservability by heating the two components contained therein to react with each other, there are disclosed heat-sensitive recording materials wherein the two components are an imino-compound and an isocyanate compound in, for example, Japanese Application Kokai Nos. 58-38733, 58-54085, 58-104959, 58-149388, 58-115887, 59-115888 and U.S. Pat. No. 4,521,793.

Since the heat-sensitive recording materials comprising an isocyanate compound and an imino compound are excellent in preservability of recorded images, there are many literature references relating to the technique of coating the whole surface of a paper substrate with an aqueous coating composition of the two components.

However, there are many problems in partial printing by a printing machine or the like. For example, partial printing with the aqueous coating composition requires a long time in the drying step. And, a plastic substrate is inferior in wettability by an aqueous coating composition to the paper substrate. Therefore, in coating the plastic substrate with an aqueous coating composition, it is impossible to obtain a uniform coating because beading phenomenon appears. Moreover, the coat layer obtained thereby has poor adhesion to the substrate and may be easily peeled from the substrate when it is wetted by water and then rubbed.

SUMMARY OF THE INVENTION

The present inventors have made extensive research in order to develop an ink for heat-sensitive recording with which a substrate can be partially printed and which has excellent adhesion and water-resistance. As a result, it has been found that the desired ink can be obtained by dispersing and/or dissolving an aromatic isocyanate compound and an imino compound used as coupler in an organic solvent and using two specific components as binders. According to this invention, there is provided an ink for heat-sensitive recording which comprises, as color developing components, an aromatic or heterocyclic isocyanate compound and an imino compound, the two color developing components being dispersed and/or dissolved in an organic solvent and, as a binder, (1) a copolymer of a mixture of (a) $\alpha,\beta$-ethylenically unsaturated carboxylic acid and (b) at least one monomer selected from the group consisting of acrylic acid esters, methacrylic acid esters and aromatic vinyl compounds and/or (2) a three-component- or more component-copolymer, the fundamental skelton of which is composed of isobutylene and maleic anhydride.

DETAILED DESCRIPTION OF THE INVENTION

The $\alpha,\beta$-ethylenically unsaturated carboxylic acid used as component (a) of copolymer (1) in this invention includes acrylic acid, methacrylic acid, maleic acid, fumaric acid, itaconic acid and the like. The acrylic acid ester and methacrylic acid ester used as component (b) include ethyl, propyl, buthyl, hexyl and 2-ethylhexyl acrylates and methacrylates and the like. The aromatic vinyl compound includes styrene, vinyltoluene, halogenated styrenes, methylstyrene and the like.

In order to obtain sufficient water-resistance, the $\alpha,\beta$-ethylenically unsaturated carboxylic acid is contained in an amount of, preferably 0.1–10 mol %, more preferably 0.5–5 mol % based on the total mol of component (a) and component (b). The mixture of component (a) and component (b) may additionally contain an ethyleneimine compound or an epoxy compound as a copolymerizing component to improve the water-resistance.

The three-component- or more component-copolymer (2), the fundamental skelton of which is composed of isobutylene and maleic anhydride includes isobutylene/maleic anhydride/styrene terpolymer, isobutylene/maleic anhydride/methyl acrylate terpolymer, isobutylene/maleic anhydride/ethyl acrylate terpolymer, isobutylene/maleic anhydride/methyl methacrylate terpolymer, isobutylene/maleic anhydride/ethyl methacrylate terpolymer, isobutylene/maleic anhydride/N-phenylmaleimide terpolymer, isobutylene/maleic anhydride/styrene/methyl acrylate quadripolymer, isobutylene/maleic anhydride/styrene/ethyl acrylate quadripolymer, isobutylene/maleic anhydride/styrene/methyl methacrylate quadripolymer, isobutylene/maleic anhydride/styrene/ethyl methacrylate quadripolymer and the like.

In this invention, in order to further improve the water-resistance of the three-component- or more component-copolymer, the fundamental skelton of which is composed of isobutylene and maleic anhydride, a polyfunctional compound which has hydroxyl groups, amino groups, epoxy groups or the like may be added to and reacted with the copolymer. The compound includes 1,4-butanediol, ethylene glycol, glycerin, 3-methyl-1,3,5-pentanetriol, ethanolamine, ethylenediamine, glycidyl methacrylate, epoxy resin and the like.

The binder is contained in an amount of, preferably 5-50%, more preferably 10-30%, by weight based on the total weight of the solid components. When the content is less than 5%, sufficient adhesion and water-resistance cannot be obtained. When it is more than 50%, sufficient color density cannot be obtained.

The organic solvent used in this invention includes alcohols, esters and hydrocarbons. Among these, preferred are aliphatic alcohols having 1-4 carbon atoms. Specifically, the alcohols include methanol, ethanol, n-propanol, iso-propanol, butanol and the like. The esters include ethyl acetate, propyl acetate and the like. The hydrocarbons include hexane, light oil and the like.

The ink for heat-sensitive recording of this invention enables partial printing of a plastic substrate such as a polyester sheet. For printing only necessary portions of a substrate, appropriate is a printing machine, and particularly appropriate are a gravure printing machine, flexographic press, screen printer and the like. However, if the viscosity of the ink is properly adjusted, there may also be used a letterpress printing machine, an offset printing machine or the like. Since these printing machines generally have poor drying capacity, it is preferable to use a volatile organic solvent. However, if the printing machine used has a relatively large drying capacity, water may be co-used in such an amount that the stability of the ink may be kept.

When the whole surface of a substrate is coated, there can also be used a suitable machine such as an air-knife coater, a roll coater, a blade coater or the like.

The binder used in this invention has a good compatibility with an alcoholic solvent and is not deteriorated thereby. Therefore, it is preferable to mainly use an alcoholic solvent. It is preferable to use an hydrocarbon solvent as a diluent for controlling the drying during the printing.

As the binder used in this invention has a good compatibility with an organic solvent, the drying period in the printing process can be shortened. Moreover, the coat layer obtained according to this invention has excellent adhesion to a plastic substrate and excellent water-resistance. These effects are enhanced by using said two binders together.

The aromatic or heterocyclic isocyanate compound used in this invention is colorless or pale colored substances and solid at room temperature. Specifically, the aromatic or heterocyclic isocyanate compound includes 2,6-dichlorophenylisocyanate, p-chlorophenylisocyanate, 1,3-phenylenediisocyanate, 1,4-phenylenediisocyanate, 3-dimethylbenzene-4,6-diisocyanate, 1,4-dimethylbenzene-2,5-diisocyanate, 1-methoxybenzene-2,4-diisocyanate, 1-methoxybenzene-2,5-diisocyanate, 1-ethoxybenzene-2,4-diisocyanate, 2,5-dimethoxybenzene-1,4-diisocyanate, 2,5-diethoxybenzene-1,4-diisocyanate, 2,5-dibutoxybenzene-1,4-diisocyanate, azobenzene-4,4'-diisocyanate, diphenyl ether-4,4'-diisocyanate, naphthalene-1,4-diisocyanate, naphthalene-1,5-diisocyanate, naphthalene-2,6-diisocyanate, 3,3'-naphthalene-2,7-diisocyanate, 3,3'-dimethylbiphenyl-4,4'-diisocyanate, dimethoxybiphenyl-4,4'-diisocyanate, diphenylmethane-4,4'-diisocyanate, benzophenone-3,3'-diisocyanate, fluorene-2,7-diisocyanate, anthraquinone-2,6-diisocyanate, 9-ethylcarbazole-3,6-diisocyanate, pyrene-3,8-diisocyanate, naphthalene-1,3,7-triisocyanate, biphenyl-2,4,4'-triisocyanate 4,4',4''-triisocyanato-2,5-dimethoxytriphenylamine, p-dimethylaminophenylisocyanate, tris(4-phenylisocyanato)thiophosphate and the like. These isocyanate compounds may be used alone or in combination of two or more. If necessary, these may be used in the form of a so-called block isocyanate, which is an adduct with a phenol, a lactam, an oxime or the like. A dimer of diisocyanate such as a dimer of 1-methylbenzene-2,4-diisocyanate; an isocyanurate, which is a trimer of diisocyanate; and a polyisocyanate in which a polyol or the like is added to a diisocyanate may also be used.

The imino compound used in this invention is a compound represented by the following general formula:

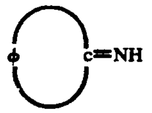

wherein φ represents an aromatic compound residue which can form a conjugate system with C=N adjacent thereto. The imino compound is colorless or pale colored and solid at room temperature. If necessary, the imino compound may be used in combination of two or more. The imino compound includes 3-iminoisoindoline-1-one, 3-imino-4,5,6,7-tetrachloroisoindoline-1-one, 3-imino-4,5,6,7-tetrabromoisoindoline-1-one, 3-imino-4,5,6,7-tetrafluoroisoindoline-1-one, 3-imino-5,6-dichloroisoindoline-1-one, 3-imino-4,5,7-trichloro-6-methoxyisoindoline-1-one, 3-imino-4,5,7-trichloro-6-methylmercaptoisoindoline-1-one, 3-imino-6-nitroisoindoline-1-one, 3-imino-isoindoline-1-spiro-dioxolan, 1,1-dimethoxy-3-imino-isoindoline, 1,1-diethoxy-3-imino-4,5,6,7-tetrachloroisoindoline, 1-ethoxy-3-iminoisoindoline, 1,3-diiminoisoindoline, 1,3-diimino-4,5,6,7-tetrachloroisoindoline, 1,3-diimino-6-methoxyisoindoline, 1,3-diimino-6-cyanoisoindoline, 1,3-diimino-4,7-dithia-5,5,6,6-tetrahydroisoindoline, 7-amino-2,3-dimethyl-5-oxopyrrolo[3,4-b]pyrazine, 7-amino-2,3-diphenyl-5-oxopyrrolo[3,4-b]pyrazine, 1-iminonaphthalimide, 1-iminodiphenimide, 1-phenylimino-3-iminoisoindoline, 1-(3'-chlorophenylimino)-3-iminoisoindoline, 1-(2',5'-dichlorophenylimino)-3-iminoisoindoline, 1-(2',4',5'-trichlorophenylimino)-3-iminoisoindoline, 1-(2'-cyano-4'-nitrophenylimino)-3-iminoisoindoline, 1-(2'-chloro-5'-cyanophenylimino)-3-iminoisoindoline, 1-(2',6'-dichloro-4'-nitrophenylimino)-3-iminoisoindoline, 1-

(2',5'-dimethoxyphenylimino)-3-iminoisoindoline, 1-(2',5'-diethoxyphenylimino)-3-iminoisoindoline, 1-(2'-methyl-4'-nitrophenylimino)-3-iminoisoindoline, 1-(5'-chloro-2'-phenoxyphenylimino)-3-iminoisoindoline, 1-(4'-N,N-dimethylaminophenylimino)-3-iminoisoindoline, 1-(3'-N,N-dimethylamino-4'-methoxyphenylimino)-3-iminoisoindoline, 1-(2'-methoxy-5'-N-phenylcarbamoylphenylimino)-3-iminoisoindoline, 1-(5',6'-dichlorobenzothiazolyl-2'-imino)-3-iminoisoindoline, 1-(6'-methylbenzothiazolyl-2'-imino)-3-iminoisoindoline, 1-(4'-phenylaminophenylimino)-3-iminoisoindoline, 1-(p-phenylazophenylimino)-3-iminoisoindoline, 1-(naphthyl-1'-imino)-3-iminoisoindoline, 1-(anthraquinone-1'-imino)-3-iminoisoindoline, 1-(5'-chloroanthraquinone-1'-imino)-3-iminoisoindoline, 1-(N-ethylcarbazolyl-3'-imino)-3-iminoisoindoline, 1-(naphthoquinone-1'-imino)-3-iminoisoindoline, 1-(pyridyl-4'-imino)-3-iminoisoindoline, 1-(benzimidazolone-6'-imino)-3-iminoisoindoline, 1-(1'-methylbenzimidazolone-6'-imino)-3-iminoisoindoline, 1-(7'-chlorobenzimidazolone-5'-imino)-3-iminoisoindoline, 1-(benzimidazolyl-2'-imino)-3-iminoisoindoline, 1-(benzimidazolyl-2'-imino)-3-imino-4,5,6,7-tetrachloroisoindoline, 1-(2',4'-dinitrophenylhydrazone)-3-iminoisoindoline, 1-(indolyl-3'-imino)-3-iminoisoindoline, 1-(indazolyl-3'-imino)-3-imino-4,5,6,7-tetrabromoisoindoline, 1-(indazolyl-3'-imino)-3-imino-4,5,6,7-tetrafluoroisoindoline, 1-(benzimidazolyl-2'-imino)-3-imino-4,7-dithiatetrahydroisoindoline, 1-(4',5'-dicyanoimidazolyl-2'-imino)-3-imino-5,6-dimethyl-4,7-pyradiisoindoline, 1-(cyanobenzoylmethylene)-3-iminoisoindoline, 1-(cyanocarboxamidomethylene)-3-iminoisoindoline, 1-(cyanocarbomethoxymethylene)-3-iminoisoindoline, 1-(cyanocarbethoxymethylene)-3-iminoisoindoline, 1-(cyano-N-phenylcarbamoylmethylene)-3-iminoisoindoline, 1-[cyano-N-(3'-methylphenyl)-carbamoylmethylene]-3-iminoisoindoline, 1-[cyano-N-(4'-chlorophenyl)carbamoylmethylene]-3-iminoisoindoline, 1-[cyano-N-(4'-methoxyphenyl)carbamoylmethylene]-3-iminoisoindoline, 1-[cyano-N-(3'-chloro-4'-methylphenyl)-carbamoylmethylene]-3-iminoisoindoline, 1-(cyano-p-nitrophenylmethylene)-3-iminoisoindoline, 1-(dicyanomethylene)-3-iminoisoindoline, 1-[(cyano-1',2',4'-triazolyl-3')carbamoylmethylene]-3-iminoisoindoline, 1-[(cyanothiazolyl-2')carbamoylmethylene]-3-iminoisoindoline, 1-[(cyanobenzimidazolyl-2')-carbamoylmethylene]-3-iminoisoindoline, 1-[(cyanobenzothiazolyl-2')carbamoylmethylene]-3-iminoisoindoline, 1-[(cyanobenzimidazolyl-2')methylene]-3-iminoisoindoline, 1-[(cyanobenzimidazolyl-2')methylene]-3-imino-4,5,6,7-tetrachloroisoindoline, 1-[(cyanobenzimidazolyl-2')-methylene]-3-imino-5-methoxyisoindoline, 1-[(cyanobenzimidazolyl-2')methylene]-3-imino-6-chloroisoindoline, 1-[(1'-phenyl-3'-methyl-5-oxo)-pyrazolidene-4']-3-iminoisoindoline, 1-[(cyanobenzimidazolyl-2')-methylene]-3-imino-4,7-dithiatetrahydroisoindoline, 1-[(cyanobenzimidazolyl-2')-methylene]-3-imino-5,6-dimethyl-4,7-pyradiisoindoline, 1-[(1'-methyl-3'-n-butyl)-barbituric acid-5']-3-iminoisoindoline, 3-imino-1-sulfo-6-chlorobenzoimide, 3-imino-1-sulfo-5,6-dichlorobenzimide, 3-imino-1-sulfo-4,5,6,7-tetrachlorobenzimide, 3-imino-1-sulfo-4,5,6,7-tetrabromobenzoimide, 3-imino-1-sulfo-4,5,6,7-tetrafluorobenzimide, 3-imino-1-sulfo-6-nitrobenzimide, 3-imino-1-sulfo-6-methoxybenzimide, 3-imino-1-sulfo-4,5,7-trichloro-6-methylmercaptobenzimide, 3-imino-1-sulfonaphthimide, 3-imino-1-sulfo-5-bromonaphthimide, 3-imino-2-methyl-4,5,6,7-tetrachloroisoindoline-1-one and the like.

The present ink may additionally comprise a heat-meltable substance to improve thermal response. The melting point of the heat-meltable substance is preferably 60°-180° C., more preferably 80°-140° C. The heat-meltable substance includes benzyl p-benzyloxybenzoate, stearamide, palmitamide, N-methylolstearamide, $\beta$-naphthyl benzyl ether, N-stearylurea, N,N'-distearylurea, phenyl $\beta$-naphthoate, phenyl 1-hydroxy-2-naphthoate, $\beta$-naphthyl p-methylbenzyl ether, 1,4-dimethoxynaphthalene, 1-methoxy-4-benzyloxynaphthalene, N-stearoylurea, 4-benzylbiphenyl, 1,2-di(m-methylphenoxy)-ethane, 1-phenoxy-2-(4-chlorophenoxy)ethane, 1,4-butanediol phenyl ether, dimethyl terephthalate and the like.

These heat-meltable substances may be used alone or in combination of two or more. To obtain sufficient thermal response, the heat-meltable substance is used in an amount of, preferably 10-300%, more preferably 20-250%, by weight based on the weight of the isocyanate compound.

The present ink may also comprise a pigment such as diatomaceous earth, talc, calcined kaolin, calcium carbonate, magnesium carbonate, titanium dioxide, zinc oxide, silicon dioxide, aluminum hydroxide, ureaformaldehyde resin or the like; a metal salt of higher fatty acid such as zinc stearate, calcium stearate or the like for the purpose of prevention of head wear, sticking and the like; a wax such as paraffin, polyethylene, oxidized paraffin, oxidized polyethylene, stearamide, castor wax or the like; a dispersing agent such as sodium dioctylsulfosuccinate or the like; an ultraviolet-ray absorbent of benzophenone type, benzotriazol type or the like; a surfactant; a fluorescent dye; and the like.

As the substrate, there can mainly be used a plastic sheet such as a polyester sheet, a polypropylene sheet, a polyvinylchloride sheet or the like or a paper sheet. However, there can also be used a nonwoven fabric, laminated paper, metal foil, a composite sheet consisting of a combination of them or the like depending upon the purpose.

In the present ink, the binder compatible with an organic solvent is contained and imparts to the ink a good wettability to a substrate, especially to a plastic substrate and can be dried rapidly in a printing machine. Furthermore, the binder used in this invention has excellent adhesion to a substrate and water-resistance, and hence, the adhesion to a substrate and water-resistance of the heat-sensitive recording layer can be improved.

DESCRIPTION OF PREFERRED EMBODIMENTS OF THE INVENTION

The following Examples further illustrate the invention.

EXAMPLE 1

(1) Preparation of ethyl acrylate/methyl methacrylate copolymer

To 150 g of isopropanol were added 55 g of ethyl acrylate, 35 g of methyl methacrylate and 10 g of methacrylic acid. To the resulting mixture was added 0.5 g of benzoyl peroxide, and thereafter, the mixture thus-obtained was subjected to polymerization reaction at 80° C. for 7 hours. Subsequently, 200 g of water and 4 g of 28% ammonia water were added thereto, and then, the isopropanol was completely removed by distillation to obtain an ethyl acrylate/methyl methacrylate copolymer.

(2) Preparation of an ink for heat-sensitive recording and partial printing therewith An imino compound or an aromatic isocyanate compound as shown in the following Dispersion A or B, respectively, which is a color-developing component, and a heat-fusible substance as shown below were added to a 1% solution of poly(vinyl alcohol) (the saponification degree: 30–40 mol %) in isopropanol. Then, the mixture thus-obtained was stirred in a ball mill for 24 hours to prepare Dispersion A or B.

| | |
|---|---|
| Dispersion A | |
| 1,3-Diimino-4,5,6,7-tetrachloroisoindoline: | 15 g |
| Benzyl p-benzyloxybenzoate: | 15 g |
| Zinc stearate: | 10 g |
| 1% Solution of poly(vinyl alcohol) in isopropanol: | 120 g |
| Dispersion B | |
| 4,4',4''-Triisocyanate-2,5-dimethoxyphenylamine: | 10 g |
| Benzyl p-benzyloxybenzoate: | 15 g |
| 1% Solution of poly(vinyl alcohol) in isopropanol: | 75 g |

Dispersion A and Dispersion B thus-obtained were mixed together. To the dispersion mixture was added a 25% calcium carbonate dispersion obtained by dispersing 15 g of calcium carbonate in 45 g of a 1% solution of poly(vinyl alcohol) in isopropanol and well stirred. Subsequently, to the resulting mixture was added, as a binder, 80 g of a 25% aqueous solution of ethyl acrylate/methyl methacrylate copolymer obtained in (1) above and the mixture was stirred enough to prepare an ink for heat-sensitive recording.

A polyester sheet having thickness of 125 μm was partially printed with the ink thus-obtained in a proportion of 3 g/m² by a gravure printing machine to obtain a recording sheet.

The adhesion to the substrate and the water-resistance of the recording sheet thus-obtained were evaluated according to the manners shown below. The results of the evaluation obtained are shown in Table 2.

EXAMPLES 2-8 AND COMPARATIVE EXAMPLES 1-4

The same procedure as in Example 1 was repeated, except that the amount of the binder was varied, the kind of the binder was varied, the kind of the organic solvent was varied depending upon the kind of the binder used or the kind of the dispersing agent was varied as shown in Table 1. In this case, the weight of Dispersion A, Dispersion B and the dispersion of calcium carbonate were not varied though the weight of the binder was varied. The weight percent of the binder based on the total weight of Dispersion A, Dispersion B or the dispersion of calcium carbonate is shown in Table 1.

The results of the evaluation are shown in Table 2.

Test 1 (recording density test)

On the recording sheets obtained in Examples 1-8 and Comparative Examples 1-4, recording was carried out by a heat-sensitive facsimile recording tester at an applied pulse of 3.0 ms and an applied voltage of 16.00 V. The recording density of the image thus recorded was measured by a Macbeth RD918 type densitometer.

Test 2 (water-resistance test)

Each of the recording sheets obtained in Examples 1-8 and Comparative Examples 1-4 was placed on a balance so that the recording layer was upward and then fixed thereon. A few drops of water were allowed to fall on the recording layer, and thereafter, a silicone rubber cap of 2 cm in diameter attached to a motor shaft was pressed thereon and a load of 600 g was applied (which corresponded to a pressure of 191 g/cm²). The motor was rotated at 300 r.p.m. for 4 seconds, and then, the state of the recording layer was evaluated with the naked eye. "" represents that the recording layer was not peeled at all. "Δ" represents that the recording layer was partly peeled. "x" represents that the whole of the recording layer was peeled.

As to the recording sheets, the unrecorded portion of which was evaluated as  or Δ in respect of water-resistance, recording density was measured according to Test 1 after drying the sheets which had been subjected to the water-resistance test to find that the recording density was substantially not lowered by the water-resistance test. However, as to the recording sheets the unrecorded portion of which was evaluated as x in respect of water-resistance, it was found after the same test that the recording density was remarkably lowered by the water-resistance test.

Moreover, as to the recording sheets, the recorded portion of which was evaluated as  or Δ in respect of water-resistance, the recording density was substantially not lowered by the water-resistance test. However, as to the recording sheets, the recorded portion of which was evaluated as x in respect of water-resistance, the recording density was so remarkably lowered that it was very difficult or impossible to decipher the recorded images.

Test 3 (adhesion test)

To the coated portion of each of the recording sheets obtained in Examples 1-8 and Comparative Examples 1-4 was applied an adhesive tape (Scotch 810®, a trade name of Sumitomo 3M). And then, the applied adhesive tape was peeled off from the sheet and the state of the recording layer was observed with the naked eye to evaluate the adhesion. "" represents that the recording layer was not peeled at all. "Δ" represents that the recording layer was partly peeled. "x" represents that the whole of the recording layer was peeled off.

TABLE 1

| | Binder | Binder content (weight %) | Dispersing agent | Organic solvent |
|---|---|---|---|---|
| Example 2 | Ethyl acrylate/methyl methacrylate copolymer | 8 | Poly(vinyl alcohol) | Isopropanol |
| Example 3 | Ethyl acrylate/methyl methacrylate copolymer | 10 | Poly(vinyl alcohol) | " |
| Example 4 | Ethyl acrylate/methyl methacrylate copolymer | 30 | Poly(vinyl alcohol) | " |
| Example 5 | Isobutylene/maleic anhydride/N-phenylmaleimide terpolymer | 30 | Poly(vinyl alcohol) | Ethanol |

TABLE 1-continued

| | Binder | Binder content (weight %) | Dispersing agent | Organic solvent |
|---|---|---|---|---|
| Example 6 | Isobutylene/maleic anhydride/styrene terpolymer | 25 | Isobutynene/maleic anhydride/styrene terpolymer | Ethyl acetate |
| Example 7 | Ethyl acrylate/methyl methacrylate copolymer | 10 | Poly(vinyl alcohol) | Isopropanol |
| | Isobutylene/maleic anhydride/N-phenylmaleimide terpolymer | 5 | | |
| Example 8 | Isobutylene/maleic anhydride/methyl acrylate terpolymer | 10 | Isobutylene/maleic anhydride/styrene terpolymer | Ethyl acetate |
| | Methyl methacrylate/isobutyl methacrylate copolymer | 10 | | |
| Comparative Example 1 | Poly(vinyl alcohol) | 20 | Poly(vinyl alcohol) | Ethanol |
| Comparative Example 2 | Styrene/maleic anhydride copolymer | 30 | Poly(vinyl alcohol) | " |
| Comparative Example 3 | Ethyl acrylate/methyl methacrylate/methacrylic acid terpolymer | 4 | Poly(vinyl alcohol) | Isopropanol |
| Comparative Example 4 | Ethyl acrylate/methyl methacrylate/methacrylic acid terpolymer | 51 | Poly(vinyl alcohol) | " |

TABLE 2

| | Recording density | Water-resistance Recorded area | Unrecorded area | Adhesion |
|---|---|---|---|---|
| Example 1 | 1.03 | ○ | ○ | ○ |
| Example 2 | 1.08 | Δ | ○ | Δ |
| Example 3 | 1.06 | Δ~○ | ○ | ○ |
| Example 4 | 1.01 | ○ | ○ | ○ |
| Example 5 | 1.00 | ○ | ○ | ○ |
| Example 6 | 1.02 | ○ | ○ | ○ |
| Example 7 | 1.05 | ○ | ○ | ○ |
| Example 8 | 1.04 | ○ | ○ | ○ |
| Comparative Example 1 | 1.02 | x | x | x |
| Comparative Example 2 | 0.93 | x | x | x |
| Comparative Example 3 | 1.05 | x | Δ | x |
| Comparative Example 4 | 0.56 | ○ | ○ | ○ |

As is clear from the results shown in Table 2, Examples 1-8 are excellent in recording density, water-resistance and adhesion. On the other hand, Comparative Examples 1 and 2 are poor in all properties. Comparative Example 3 is poor in water-resistance of unrecorded portion and adhesion on account of a short amount of the binder used. Comparative Example 4 is poor in recording density on account of an excessive amount of the binder used.

What is claimed is:

1. An ink for heat-sensitive recording which comprises, as color-developing components, an aromatic or heterocyclic isocyanate compound and an imino compound which are dispersed and/or dissolved in an organic solvent and, as a binder, (1) a copolymer of a mixture of component (a) which is an α,β-ethylenically unsaturated carboxylic acid and component (b) which is at least one monomer selected from the group consisting of acrylic acid esters, methacrylic acid esters and aromatic vinyl compounds of (2) a three-component or more component-copolymer, the fundamental skeleton of which is composed of isobutylene and maleic anhydride, or a combination of (1) and (2), wherein the binder is in an amount of from 5 to 50% by weight based on total solid components and the α,β-ethylenically unsaturated carboxylic acid is contained in an amount of from 0.1 to 10 mol % based on total of component (a) and component (b).

2. An ink for heat-sensitive recording according to claim 1, wherein said organic solvent is an alcohol, an ester or a hydrocarbon.

3. An ink for heat-sensitive recording according to claim 1, wherein said organic solvent is an aliphatic alcohol having 1-4 carbon atoms.

4. An ink for heat-sensitive recording according to claim 3, wherein said aliphatic alcohol is ethanol or isopropanol.

5. An ink for heat-sensitive recording according to claim 1, where said α,β-ethylenically unsaturated carboxylic acid is acrylic acid, methacrylic acid, maleic acid, fumaric acid or itaconic acid.

6. An ink for heat-sensitive recording according to claim 1, wherein said α,β-ethylenically unsaturated carboxylic acid is methacrylic acid.

7. An ink for heat-sensitive recording according to claim 1, wherein said acrylic acid ester is ethyl, propyl, butyl, hexyl or 2-ethylhexyl acrylate.

8. An ink for heat-sensitive recording according to claim 1, wherein said methacrylic acid ester is ethyl, propyl, butyl, hexyl or 2-ethylhexyl methacrylate.

9. An ink for heat-sensitive recording according to claim 1, wherein the content of the α,β-ethylenically unsaturated carboxylic acid is 0.5-5 mol %.

10. An ink for heat-sensitive recording according to claim 1, wherein said three-component- or more component-copolymer is isobutylene/maleic anhydride/styrene terpolymer, isobutylene/maleic anhydride/methyl acrylate terpolymer, isobutylene/maleic anhydride/ethyl acrylate terpolymer, isobutylene/maleic anhydride/methyl methacrylate terpolymer, isobutylene/maleic anhydride/ethyl methacrylate terpolymer, isobutylene/maleic anhydride/N-phenylmaleimide terpolymer, isobutylene/maleic anhydride/styrene/- methyl acrylate quadripolymer, isobutylene/maleic anhydride-styrene/ethyl acrylate quadripolymer, isobutylene/maleic anhydride/styrene/methyl methacrylate quadripolymer or isobutylene/maleic anhydride/styrene/ethyl methacrylate quadripolymer.

11. An ink for heat-sensitive recording according to claim 1, wherein the binder content is 10–30%.

12. An ink for heat-sensitive recording according to claim 1, wherein said aromatic or heterocyclic isocyanate compound is at least one monomer selected from the group consisting of 2,6-dichlorophenylisocyanate, p-chlorophenylisocyanate, 1,3-phenylenediisocyanate, 1,4-phenylenediisocyanate, 1,3-dimethylbenzene-4,6-diisocyanate, 1,4-dimethylbenzene-2,5-diisocyanate, 1-methoxybenzene-2,4-diisocyanate, 1-methoxybenzene-2,5-diisocyanate, 1-ethoxybenzene-2,4-diisocyanate, 2,5-dimethoxybenzene-1,4-diisocyanate, 2,5-diethoxybenzene-1,4-diisocyanate, 2,5-dibutoxybenzene-1,4-diisocyanate, azobenzene-4,4'-diisocyanate, diphenyl ether-4,4'-diisocyanate, naphthalene-1,4-diisocyanate, naphthalene-1,5-diisocyanate, naphthalene-2,6-diisocyanate, 3,3'-naphthalene-2,7-diisocyanate, 3,3'-dimethylbiphenyl-4,4'-diisocyanate, dimethoxybiphenyl-4,4'-diisocyanate, diphenylmethane-4,4'-diisocyanate, benzophenone-3,3'-diisocyanate, fluorene-2,7-diisocyanate, anthraquinone-2,6-diisocyanate, 9-ethylcarbazole-3,6-diisocyanate, pyrene-3,8-diisocyanate, naphthalene-1,3,7-triisocyanate, biphenyl-2,4,4'-triisocyanate, 4,4',4''-triisocyanato-2,5-dimethoxytriphenylamine, p-dimethylaminophenylisocyanate and tris(4-phenylisocyanato)thiophosphate.

13. An ink for heat-sensitive recording according to claim 12, wherein said aromatic or heterocyclic isocyanate compound is 4,4',4''-triisocyanate-2,5-dimethoxyphenylamine.

14. An ink for heat-sensitive recording according to claim 1, wherein said imino compound is at least one monomer selected from the group consisting of 3-iminoisoindoline-1-one, 3-imino-4,5,6,7-tetrachloroisoindoline-1-one, 3-imino-4,5,6,7-tetrabromoisoindoline-1-one, 3-imino-4,5,6,7-tetrafluoroisoindoline-1-one, 3-imino-5,6-dichloroisoindoline-1-one, 3-imino-4,5,7-trichloro-6-methoxyisoindoline-1-one, 3-imino-4,5,7-trichloro-6-methylmercaptoisoindoline-1-one, 3-imino-6-nitroisoindoline-1-one, 3-imino-isoindoline-1-spirodioxolan, 1,1-dimethoxy-3-imino-isoindoline, 1,1-diethoxy-3-imino-4,5,6,7-tetrachloroisonidoline, 1-ethoxy-3-iminoisoindoline, 1,3-diiminoisoindoline, 1,3-diimino-4,5,6,7-tetrachloroisoindoline, 1,3-diimino-6-methoxyisoindoline, 1,3-diimino-6-cyanoisoindoline, 1,3-diimino-4,7-dithia-5,5,6,6-tetrahydroisoindoline, 7-amino-2,3-dimethyl-5-oxopyrrolo[3,4-b]pyrazine, 7-amino-2,3-diphenyl-5-oxopyrrolo[3,4-b]pyrazine, 1-iminonaphthalimide, 1-iminodiphenimide, 1-phenylimino-3-iminoisoindoline, 1-(3'-chlorophenylimino)-3-iminoisoindoline, 1-(2',5'-dichlorophenylimino)-3-iminoisoindoline, 1-(2',4',5'-trichlorophenylimino)-3-iminoisoindoline, 1-(2'-cyano-4'-nitrophenylimino)-3-iminoisoindoline, 1-(2'-chloro-5'-cyanophenylimino)-3-iminoisoindoline, 1-(2',6'-dichloro-4'-nitrophenylimino)-3-iminoisoindoline, 1-(2',5'-dimethoxyphenylimino)-3-iminoisoindoline, 1-(2',5'-diethoxyphenylimino)-3-iminoisoindoline, 1-(2'-methyl-4'-nitrophenylimino)-3-iminoisoindoline, 1-(5'-chloro-2'-phenoxyphenylimino)-3-iminoisoindoline, 1-(4'-N,N-dimethylaminophenylimino)-3-iminoisoindoline, 1-(3'-N,N-dimethylamino-4'-methoxyphenylimino)-3-iminoisoindoline, 1-(2'-methoxy-5'-N-phenylcarbamoylphenylimino)-3-iminoisoindoline, 1-(5',6'-dichlorobenzothiazolyl-2'-imino)-3-iminoisoindoline, 1-(6'-methylbenzothiazolyl-2'-imino)-3-iminoisoindoline, 1-(4'-phenylaminophenylimino)-3-iminoisoindoline, 1-(p-phenylazophenylimino)-3-iminoisoindoline, 1-(naphthyl-1'-imino)-3-iminoisoindoline, 1-(anthraquinone-1'-imino)-3-iminoisoindoline, 1-(5'-chloroanthraquinone-1'-imino)-3-iminoisoindoline, 1-(N-ethylcarbazolyl-3'-imino)-3-iminoisoindoline, 1-(naphthoquinone-1'-imino)-3-iminoisoindoline, 1-(pyridyl-4'-imino)-3-iminoisoindoline, 1-(benzimidazolone-6'-imino)-3-iminoisoindoline, 1-(1'-methylbenzimidazolone-6'-imino)-3-iminoisoindoline, 1-(7'-chlorobenzimidazolone-5'-imino)-3-iminoisoindoline, 1-(benzimidazolyl-2'-imino)-3-iminoisoindoline, 1-(benzimidazolyl-2'-imino)-3-imino-4,5,6,7-tetrachloroisoindoline, 1-(2',4'-dinytrophenylhydrazone)-3-iminoisoindoline, 1-(indolyl-3'-imino)-3-iminoisoindoline, 1-(indazolyl-3'-imino)-3-imino-4,5,6,7-tetrabromoisoindoline, 1-(indazolyl-3'-imino)-3-imino-4,5,6,7-tetrafluoroisoindoline, 1-(benzimidazolyl-2'-imino)-3-imino-4,7-dithiatetrahydroisoindoline, 1-(4',5'-dicyanoimidazolyl-2'-imino)-3-imino-5,6-dimethyl-4,7-pyradiisoindoline, 1-(cyanobenzoylmethylene)-3-iminoisoindoline, 1-(cyanocarboxamidomethylene)-3-iminoisoindoline, 1-(cyanocarbomethoxymethylene)-3-iminoisoindoline, 1-(cyanocabethoxymethylene)-3-iminoisoindoline, 1-(cyano-N-phenylcarbamoylmethylene)-3-iminoisoindoline, 1-[cyano-N-(3'-methylphenyl)-carbamoylmethylene]-3-iminoisoindoline, 1-[cyano-N-(4'-chlorophenyl)carbamoylmethylene]-3-iminoisoindoline, 1-[cyano-N-(4'-methoxyphenyl)carbamoylmethylene]-3-iminoisoindoline, 1-[cyano-N-(3'-chloro-4'-methylphenyl)-carbamoylmethylene]-3-iminoisoindoline, 1-(cyano-p-nitrophenylmethylene)-3-iminoisoindoline, 1-(dicyanomethylene)-3-iminoisoindoline, 1-[(cyano-1',2',4'-triazolyl-3')carbamoylmethylene]-3-iminoisoindoline, 1-[(cyanothiazolyl-2')carbamoylmethylene]-3-iminoisoindoline, 1-[(cyanobenzimidazolyl-2')-carbamoylmethylene]-3-iminoisoindoline, 1-[(cyanobenzothiazolyl-2')carbamoylmethylene)]-3-iminoisoindoline, 1-[(cyanobenzimidazolyl-2')methylene]-3-iminoisoindoline, 1-[(cyanobenzimidazolyl-2')methylene]-3-imino-4,5,6,7-tetrachloroisoindoline, 1-[(cyanobenzimidazolyl-2')-methylene]-3-imino-5-methoxyisoindoline, 1-[(cyanobenzimidazolyl-2')methylene]-3-imino-6-chloroisoindoline, 1-[(1'-phenyl-3'-methyl-5-oxo)-pyrazolidene-4']-3-iminoisoindoline, 1-[(cyanobenzimidazolyl-2')-methylene]-3-imino-4,7-dithiatetrahydroisoindoline, 1-[(cyanobenzimidazolyl-2')-methylene]-3-imino-5,6-dimethyl-4,7-pyradiisoindoline, 1-[(1'-methyl-3'-n-butyl)-barbituric acid-5']-3-iminoisoindoline, 3-imino-1-sulfo-6-chlorobenzoimide, 3-imino-1-sulfo-5,6-dichlorobenzoimide, 3-imino-1-sulfo-4,5,6,7-tetrachlorobenzoimide, 3-imino-1-sulfo-4,5,6,7-tetrabromobenzoimide, 3-imino-1-sulfo-4,5,6,7-tetrafluorobenzoimide, 3-imino-1-sulfo-6-nitrobenzoimide, 3-imino-1-sulfo-6-methoxybenzoimide, 3-imino-1-sulfo-4,5,7-trichloro-6-methylmercaptobenzoimide, 3-imino-1-sulfonaphthoimide, 3-imino-1-sulfo-5-bromonaphthoimide, and 3-imino-2-methyl-4,5,6,7-tetrachloroisoindoline-1-one.

15. An ink for heat-sensitive recording according to claim 14, wherein said imino compound is 1,3-diimino-4,5,6,7-tetrachloroisoindoline.

16. An ink for heat-sensitive recording according to claim 1, wherein said ink additionally contains a heat-meltable substance.

17. An ink for heat-sensitive recording according to claim 16, wherein said heat-meltable substance is selected from the group consisting of benzyl p-benzyloxybenzoate, stearamide, palmitamide, N-methylolstearamide, β-naphthyl benzyl ether, N-stearylurea, N,N'-distearylurea, phenyl β-naphthoate, phenyl 1-hydroxy-2-naphthoate, β-naphthyl p-methylbenzyl ether, 1,4-dimethoxynaphthalene, 1-methoxy-4-benzyloxynaphthalene, N-stearoylurea, 4-benzylbiphenyl, 1,2-di(m-methylphenoxy)-ethane, 1-phenoxy-2-(4-chlorophenoxy)ethane, 1,4-butanediol phenyl ether and dimethyl terephthalate.

18. An ink for heat-sensitive recording according to claim 16, wherein said heat-meltable substance is contained in an amount of 10–300% by weight based on the weight of the isocyanate compound.

19. An ink for heat-sensitive recording according to claim 18, wherein the content of the heat-meltable substance content is 20–250%.

* * * * *